(12) United States Patent
Stokes

(10) Patent No.: US 8,068,255 B2
(45) Date of Patent: Nov. 29, 2011

(54) GAMUT MAPPING SPECTRAL CONTENT TO REDUCE PERCEPTIBLE DIFFERENCES IN COLOR APPEARANCE

(75) Inventor: Michael D. Stokes, Eagle, ID (US)

(73) Assignee: Microsoft Corporation, Redmond, WA (US)

( * ) Notice: Subject to any disclaimer, the term of this patent is extended or adjusted under 35 U.S.C. 154(b) by 798 days.

(21) Appl. No.: 11/561,060

(22) Filed: Nov. 17, 2006

(65) Prior Publication Data
US 2008/0117444 A1    May 22, 2008

(51) Int. Cl.
G06F 15/00    (2006.01)
(52) U.S. Cl. ........................................ 358/1.9
(58) Field of Classification Search .................. 358/1.9
See application file for complete search history.

(56) References Cited

U.S. PATENT DOCUMENTS

| | | | | |
|---|---|---|---|---|
| 6,359,703 B1 * | 3/2002 | Yabe | ............ | 358/1.9 |
| 6,594,388 B1 | 7/2003 | Gindele et al. | | |
| 6,648,475 B1 | 11/2003 | Roddy et al. | | |
| 6,744,534 B1 | 6/2004 | Balasubramanian et al. | | |
| 6,850,342 B2 | 2/2005 | Woolfe et al. | | |
| 6,956,581 B2 | 10/2005 | Cui et al. | | |
| 6,967,746 B1 | 11/2005 | Walker et al. | | |
| 7,054,035 B2 | 5/2006 | Zeng et al. | | |
| 2003/0179911 A1 * | 9/2003 | Ho et al. | ............ | 382/118 |
| 2004/0101201 A1 * | 5/2004 | Sharma et al. | ............ | 382/232 |
| 2004/0130719 A1 | 7/2004 | Wozniak et al. | | |
| 2005/0024652 A1 | 2/2005 | Gondek | | |
| 2006/0066541 A1 | 3/2006 | Gally et al. | | |
| 2006/0119870 A1 * | 6/2006 | Ho et al. | ............ | 358/1.9 |
| 2006/0158669 A1 * | 7/2006 | Haikin et al. | ............ | 358/1.9 |
| 2006/0170940 A1 | 8/2006 | Kang et al. | | |
| 2007/0058184 A1 * | 3/2007 | Kodama | ............ | 358/1.9 |
| 2007/0146745 A1 * | 6/2007 | Bezryadin | ............ | 358/1.9 |

FOREIGN PATENT DOCUMENTS

| JP | 2002281338 A | 9/2002 |
|---|---|---|
| JP | 2005265513 A | 9/2005 |

OTHER PUBLICATIONS

Ion, et al., "High Dynamic Range Data Centric Workflow System", retrieved at <<http://www.dalsa.com/dc/documents/HDR_Workflow_03-70-00298-00.pdf>>, SMPTE Technology Conference and Exhibit, Nov. 2005, Dalsa Digital Cinema, pp. 1-14.
Morovic, et al., "The Fundamentals of Gamut Mapping: A Survey", retrieved at <<http://www.colour.org/tc8-03/survey/fund_gm.pdf, Journal of Imaging Science and Technology, Jul. 2000, Colour & Imaging Institute, pp. 1-36.
Ward, "High Dynamic Range Imaging", available at least as early as << Sep. 25, 2006>>, at http://www.anyhere.com/gward/papers/cic01.pdf>>, pp. 08.

* cited by examiner

*Primary Examiner* — Benny Tieu
*Assistant Examiner* — Qian Yang
(74) *Attorney, Agent, or Firm* — Lee & Hayes, PLLC

(57) ABSTRACT

Various embodiments provide for gamut mapping spectral content. Source appearance content is created from source spectral data corresponding to a source color image. The source appearance content is mapped to an appearance delta using a gamut mapping algorithm. Destination spectral data is derived from the source spectral data and the appearance delta by way of a spectral mapping algorithm. The appearance delta corresponds to two potentially different gamuts or color spaces. Humanly perceptible differences in the color appearance of a destination image as compared the source image are reduced by the mapping techniques provided herein.

19 Claims, 4 Drawing Sheets

GAMUT MAPPING SPECTRAL CONTENT TO REDUCE PERCEPTIBLE DIFFERENCES IN COLOR APPEARANCE

BACKGROUND

The field of color management has evolved past its three-channel (i.e., red-green-blue, or RGB) device and appearance foundations into more accurate and flexible solutions, such as spectral imaging. Generally, spectral imaging is defined as the acquisition, processing, display and/or interpretation of images with a high number of (i.e., greater than three) spectral channels. The full range or spectrum of colors recognized and/or reproducible by any particular color system is referred to as the "gamut" of that system. Such a gamut is also sometimes considered in terms of a sub-region within a greater "color space".

Conversion or translation between the gamut of one device (or system) and another is referred to as "gamut mapping". Gamut mapping is ubiquitous to countless processes such as, for example, recording an image with a digital camera, and then rendering that image on paper with a color printer.

Presently, spectral processing is embodied in either homogeneous systems that do not require gamut mapping, or that incorporate simplistic assumptions that are hard coded into the system or associated device. Historical "clipping" device RGB algorithms are similar in this regard. A third alternative of spectral processing is a very iterative approach in which simple spectral metameric matches are made to attempt to minimize a color difference between entities. Such an approach is used by paint and manufacturing industries, for example, to mix numerous paint colors so as to match an existing sample such as a floor tile or cabinet surface.

Practically speaking, the light spectrum incident on a subject can vary substantially over time, resulting in an obvious change in appearance to a human observer. Furthermore, device performance remains constrained by the gamut of that particular device. Modern systems seek to use spectral processing to ensure accurate reproductions across widely varying rendering and viewing conditions. There is a continual effort to improve overall color performance of devices and systems, particularly in the field of gamut mapping.

DETAILED DESCRIPTION

Exemplary Topology

Figure 1:
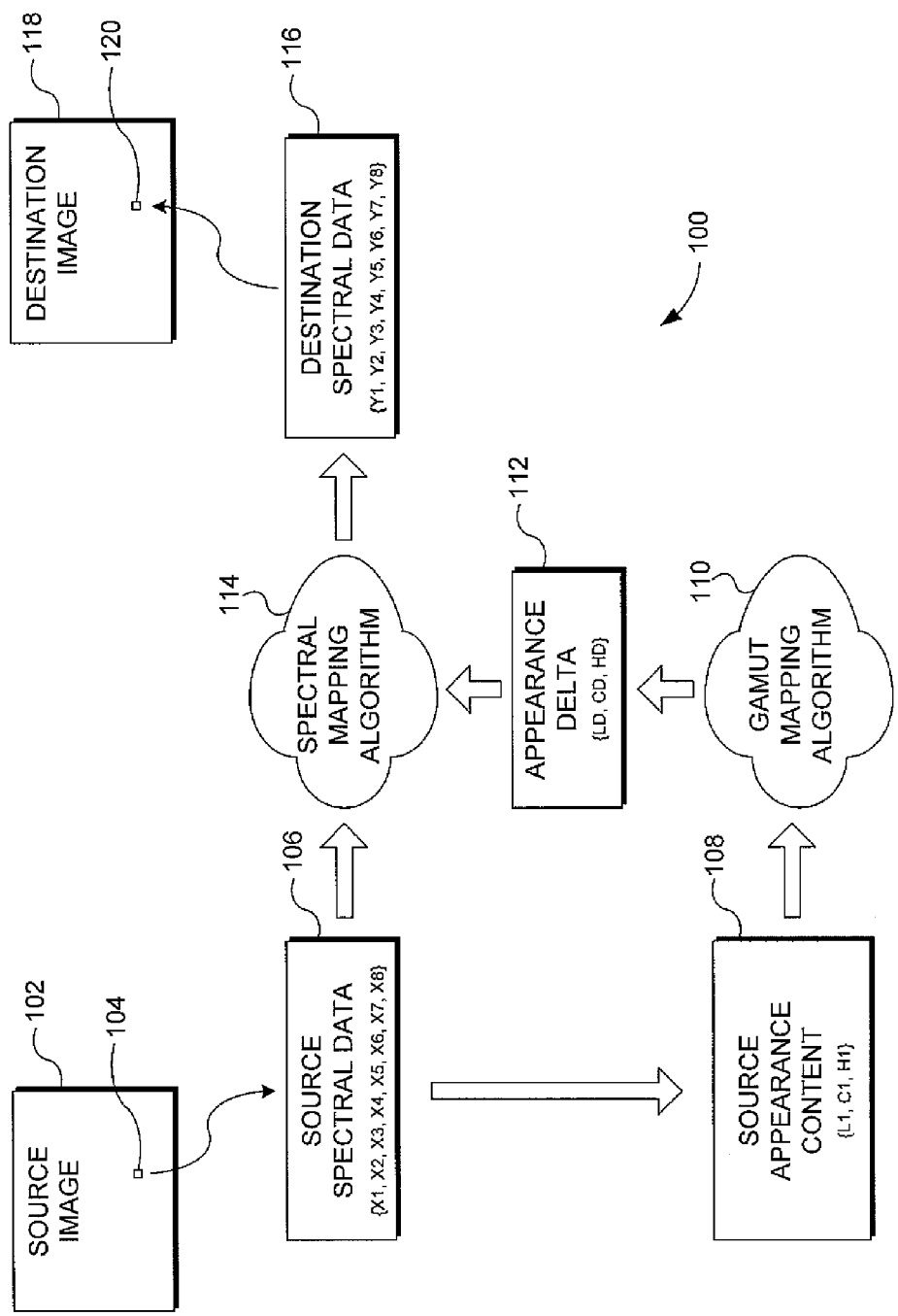
FIG. 1 depicts a topology according to one embodiment.

FIG. 1 depicts a system topology 100 according to one embodiment. The topology 100 is intended to exemplify aspects of the present subject matter in a general and widely applicable fashion. Thus, it should be appreciated that the particular details depicted in topology 100 may be varied in accordance with the scope of the present subject matter.

The topology 100 includes a source image 102. The source image 102 may be defined by any digitized image such as, for example, a digital photograph, an image synthesized and/or manipulated by computer means, an image detected by laboratory or industrial color analysis equipment, etc. In any case, the source image 102 is defined by a plurality of digitized pixels 104 such that the overall source image 102 can be represented by a finite data set. Each pixel 104 of the source image 102 can be further represented by a spectral data vector. Herein, the discrete spectral data vectors for a corresponding source image 102 are collectively referred to as the source spectral data 106.

The source spectral data 106 are comprised of four or more spectral channels in accordance with the electromagnetic spectral resolution in which the source image 102 was acquired or created. As depicted in FIG. 1, the exemplary source spectral data 106 are defined by eight spectral channels. In other embodiments, other numbers of spectral channels can be used. In one or more embodiments, the source spectral data 106 includes spectral content outside of the humanly perceptible (i.e., visual) spectrum. For non-limiting purposes of example, it is assumed that the source spectral data 106 of FIG. 1 was acquired by way of an eight-channel spectral camera including sensitivity within the visual spectrum, as well as portions of both the infra-red and ultra-violet regions of the spectrum. Other embodiments of source spectral data 106 including other visual and/or non-visual spectral content can also be used.

The topology 100 of FIG. 1 also includes source appearance content 108. The source appearance content 108 is a data set derived from the source spectral data 106 by way of any known suitable conversion method. As depicted, the exemplary source appearance content 108 is defined by three channels, namely lightness, chroma and hue. Other color channel counts corresponding to other embodiments can also be used. The source appearance content 108 corresponds to a visually-perceptible gamut (i.e., color space) of the source image 102.

Continuing the example introduced above, it is assumed that the source appearance content 108 corresponds to the gamut of the eight-channel spectral camera that acquired the source image 102 of FIG. 1. In any case, the source appearance content 108 is understood to represent the visually perceptible color content, or appearance, of the source image 102 as it was acquired or created. As a practical matter, the source spectral data 106 is considered over determined (oversampled) with respect to the source appearance content 108.

The topology 100 of FIG. 1 further includes a gamut mapping algorithm 110. The gamut mapping algorithm 110 is selected and applied so as to derive an appearance delta 112 from the source appearance content 108. In so doing, the gamut mapping algorithm compares the gamut of the source appearance content 108 with the gamut of a destination device. For purposes of example, it is assumed that that the destination device corresponds to an eight-channel inkjet printer with fluorescent imaging media capability. Fluorescent imaging media refers to media exhibiting appreciable spectral characteristics in the ultra-violet region of the spectrum. In any case, the mapping algorithm 110 is typically defined and used so that the destination delta 112 corresponds to a differential between the gamut of a source device or system (e.g., eight-channel spectral camera, etc.) and that of a destination device that is known a priori. In another embodiment, other gamut mapping criteria corresponding to another destination device are defined and used. As depicted in FIG. 1, the appearance delta 112 is defined by three channels (lightness, chroma and hue), in accordance with the three channels (i.e., dimensions) of the source appearance content 108.

In one embodiment, the gamut mapping algorithm 110 is configured to derive the appearance delta 112 in accordance with clipping (i.e., curtailing, or clamping) any values (i.e., coefficients) in the source appearance content 108 that exceed the gamut of the destination device. In another embodiment, the gamut mapping algorithm 110 derives the appearance delta 112 by way of reducing (or expanding) all values within the source appearance content 108 using linear translation. Other gamut mapping algorithms 110 can also be defined and used in accordance with known data translation methodologies.

As a general rule, the gamut mapping algorithm 110 is selected so as to reduce the visually perceptible color shift, or difference, between a destination image 118 (described in greater detail hereinafter) and the source image 102. Ideally, this difference in color content is minimal to the point of human non-perceptibility, across a relatively wide range of viewing parameters (e.g., ambient lighting conditions, etc.).

The topology 100 of FIG. 1 further includes a spectral mapping algorithm 114. The spectral mapping algorithm 114 is configured to receive the source spectral data 106 and the appearance delta 112 as inputs, and to derive destination spectral data 116. Any suitable conversion or translation technique can be used to derive the destination spectral data 116. In one or more exemplary embodiments, a look-up table (not shown) is employed in deriving the destination spectral data 116. Other techniques can also be used.

The resulting destination spectral data 116 includes a number of color channels in direct correspondence to a predetermined destination device. As depicted in FIG. 1, the destination spectral data 116 is defined by eight spectral channels. Other embodiments can also be defined and used.

As introduced above, the topology 100 of FIG. 1 includes a destination image 118. The destination image 118 corresponds to an image produced or rendered by a destination device in accordance with the destination spectral data 116. By way of the ongoing example, such a destination device is understood to be an eight-channel inkjet printer with fluorescent capability (not shown). However, in another embodiment, the destination device is defined by a color laser printer, a display monitor, etc. The destination image 118, when rendered, is humanly perceptible, at least in part, and is understood to satisfy any number of performance criteria. As depicted in FIG. 1, the destination image 118 is understood to be defined by a plurality of digitized pixels 120, as collectively represented by the destination spectral data 116.

In the ongoing example, the rendered destination image 118 is defined by an eight-channel color image rendered on photographic paper. As such, one possible performance criteria is that when viewed by a human, the rendered destination image 118 appears essentially identical in color content under both natural sunlight and incandescent illumination, or some other predetermined range of viewing conditions. In another example, the destination image 118 is rendered on a color computer monitor (not shown) and is required to appear substantially the same to a human viewer under a wide spectral range of fluorescent illumination, such as might occur in varying office environments. Other performance (appearance) criteria corresponding to other application scenarios can also be used.

Exemplary Method

Figure 2:
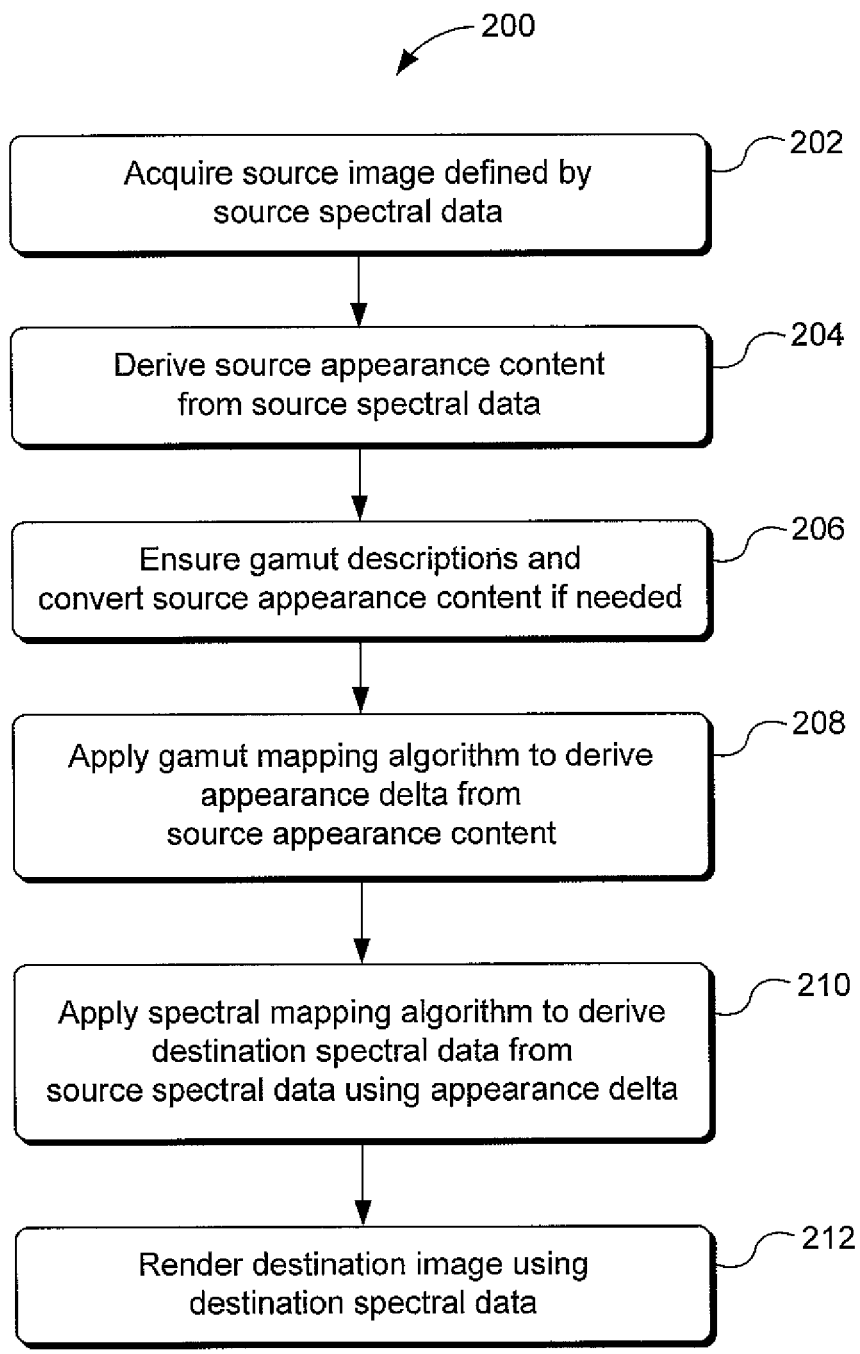
FIG. 2 depicts a process flow diagram according to another embodiment.

FIG. 2 depicts a process flow diagram 200 according to another embodiment. While the flow diagram 200 depicts particular process steps and order of execution, it is to be understood that other processes comprising these and/or other procedural steps can also be defined and used in accordance with the present teachings. In the interest of clarity, the flow diagram 200 will be described with exemplary reference to the topology 100 of FIG. 1.

At step 202, a source image is acquired, or created. The source image is defined by a finite source spectral data set. For example, the source spectral data 106 of FIG. 1 represents the source image 102.

At step 204, source appearance content is derived from the source spectral data. This derivation can be defined, at least in part, by known value clipping, linear translation, and/or other techniques. For example, source appearance content 108 can be derived at from source spectral data 106. In this exemplary case, the appearance content is assumed to be defined by three channels (i.e., lightness, chroma and hue).

At step 206, the appearance content derived in step 204 above is verified to ensure that the (color) gamut thereof corresponds to the gamut of the source image of the source spectral data. Any conversions that may be required can be applied to the appearance content at this step 206. For example, the source appearance content 108 may utilize conversion of its appearance-based dimensions (e.g., lightness, chroma and hue) in order to ensure an appropriate gamut representation.

At step 208, a gamut mapping algorithm is applied to the (possibly) converted appearance content from step 206 above to realize an appearance delta data set. For example, the source appearance content 108, as converted above (if necessary), is mapped to an appearance delta 112 by way of a gamut mapping algorithm 110. The gamut mapping procedure corresponds, at least in part, to a differential between the gamut of the source image and a gamut of a destination image. In other words, the gamut mapping algorithm is configured to account for differences between the color space of a source device and the color space of a destination device. For example, the gamut mapping algorithm 110 derives an appearance delta 112 that is defined by three channels in correspondence to the source appearance content 108 (lightness, chroma and hue).

At step 210, destination spectral data is derived from the source spectral data by way of a spectral mapping algorithm. The spectral mapping algorithm uses the appearance delta as an input in the derivation process. The destination spectral data is understood to correspond to a destination image that can be rendered directly from the destination spectral data by way of the appropriate means. The destination spectral data is defined by a spectral channel count in correspondence to that of the source spectral data. For example, destination spectral data 116 is derived from the source spectral data 106 by a spectral mapping algorithm 114, using the appearance delta 112 in the derivation process. The exemplary destination spectral data 116 is defined by eight spectral channels. A look-up table and/or other means can be used by the spectral mapping algorithm 114 in accordance with various embodiments.

At step 212, the destination spectral data is rendered to create a visible destination image. For example, an eight-channel inkjet printer can be used to render a visibly perceptible destination image 118 on paper directly from the destination spectral data. In any case, the destination spectral data is derived to achieve a best tristimulus (i.e., three-channel) match, so as to reduce—ideally, minimize—any visually perceptible differences in color content when the ultimately rendered image is viewed under varying illumination and/or other relevant conditions.

Exemplary Topology

Figure 3:
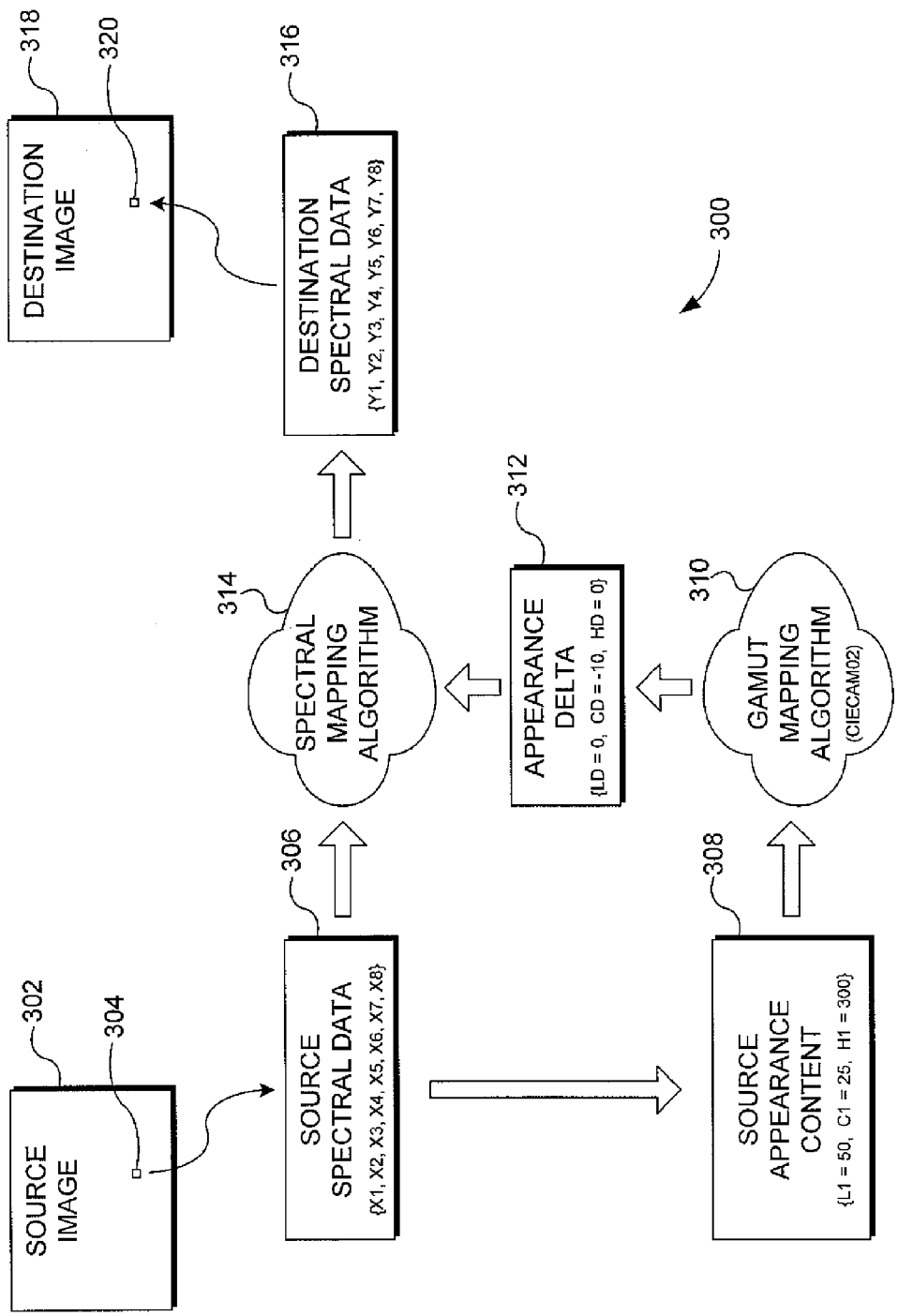
FIG. 3 depicts a topology according to one exemplary operation.

FIG. 3 depicts a system topology 300 according to one exemplary operation. The topology 300 is intended to exemplify one possible embodiment or process in accordance with the present subject matter. It should be appreciated that the particular details of topology 300 are intended as clarifying and non-limiting in nature. The topology 300 includes elements 302-320 that correspond to elements 102-120, respectively, of the topology 100 of FIG. 1, as elaborated upon below.

As depicted, the topology 300 of FIG. 3 includes a source image 302. The source image 302 is represented by a plurality of digitized pixels 304, which in turn is collectively referred to as source spectral data 306. Source appearance content 308 is derived from the source spectral content 306. The source appearance content 308 includes three exemplary channel coefficients, wherein lightness (L1) equals fifty, chroma (C1) equals twenty-five, and hue (H1) equals three hundred. In this way, the source appearance content 308 corresponds to the visual gamut of the source image 302—accordingly, the gamut of a source device (e.g., camera, color analyzer, etc.) from which the source image 302 was generated and/or acquired.

The topology 300 of FIG. 3 also includes a gamut mapping algorithm 310. The gamut mapping algorithm 310 includes and makes use of color appearance modeling CIECAM02. CIECAM02 is more fully explained by: Nathan Moroney et al., *The CIECAM02 Color Appearance Model*, IS&T/SID Tenth Color Imaging Conference, as posted on the Internet at least as of Nov. 11, 2006 at: http://www.scarse.org/docs/papers/CIECAM02.pdf#search='ciecam02'. In any case, the gamut mapping algorithm 310 is configured to receive the source appearance content 308 and derive an appearance delta 312 there from.

As introduced above, the appearance delta 312 includes three channel coefficients, wherein lightness delta (LD) equals zero, chroma delta (CD) equals minus ten, and hue delta (HD) equals zero. In this way, the appearance delta 312 is understood to correspond to a differential between the gamut of the source image 302 (or a source device), and the gamut of a destination image 318—accordingly, the gamut of a destination device (e.g., multi-channel printer, etc.).

The topology 300 of FIG. 3 further includes a spectral mapping algorithm 314 that is configured to derive destination spectral data 316 from the source spectral data 306, using the appearance delta 312 in the process. In one embodiment, a look-up table (not shown) is used in the derivation process. Other configurations and embodiments of the spectral mapping algorithm 314 can also be used. From there, a destination image 318, comprised of digitized pixels 320, can be rendered directly from the destination spectral data 316 by way of a corresponding destination device (not shown).

It is to be understood that the foregoing teachings can be implemented, to one extent or another, by way of various suitable means. In one embodiment, a dedicated-purpose electronic circuit or state machine is defined to perform one or more processes in accordance with these teachings. In another embodiment, one or more tangible computer-readable media are provided that include computer-readable instructions thereon, wherein the instructions are configured to cause one or more processors (i.e., computers, microcontrollers, etc.) to perform one or more of the above-described methods, algorithms and/or derivations. Other suitable electronic, mechanical and/or chemical means, or devices and/or systems comprising any or all of these technical fields, can also be used to perform the present teachings.

Exemplary Computer Environment

Figure 4:
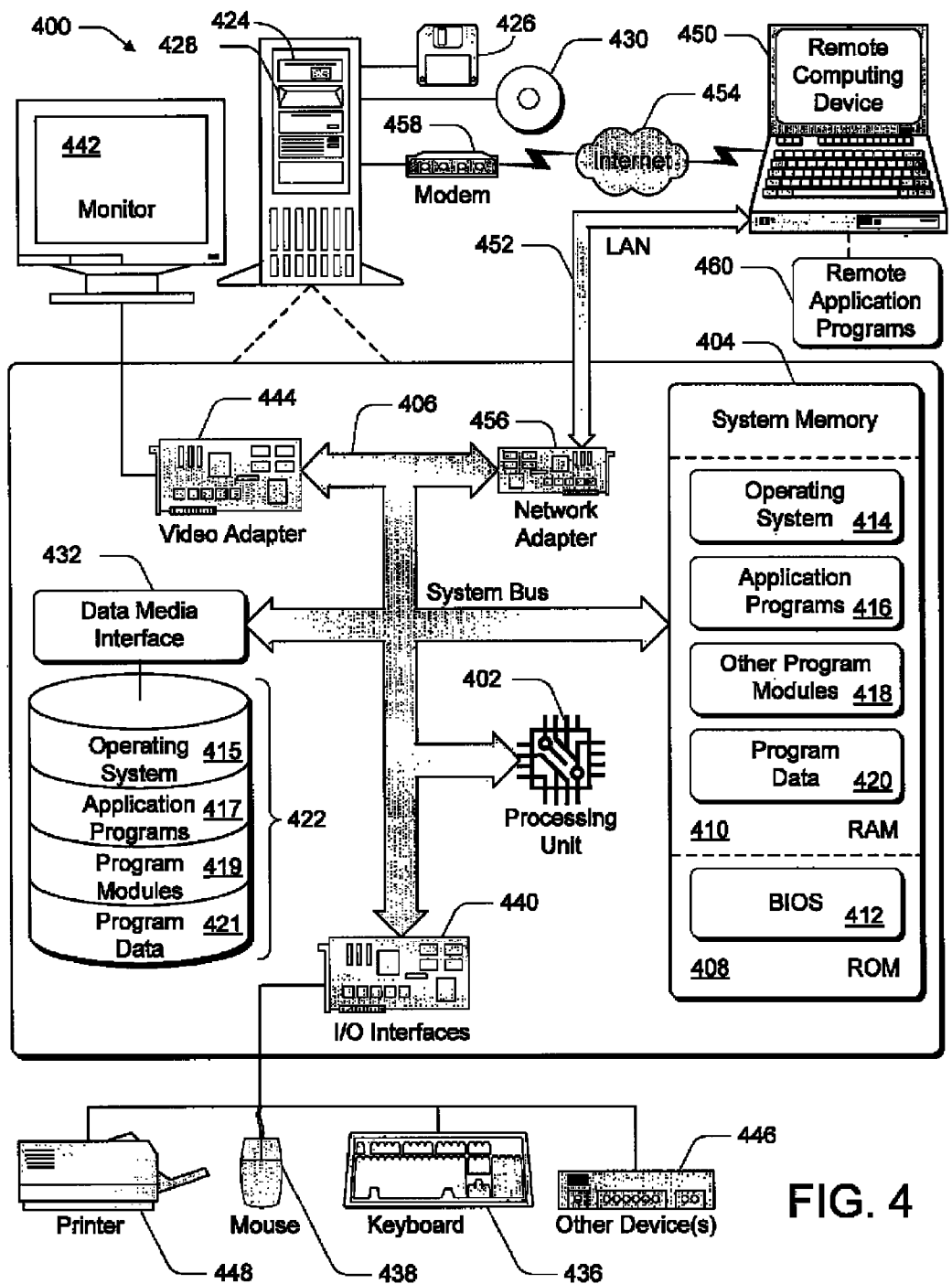
FIG. 4 depicts an exemplary computer environment according to one embodiment.

Various of the methods, techniques, derivations and/or process steps described herein can be implemented with a computing system. FIG. 4 shows components of an exemplary computing system—that is, a computer, referred to by reference numeral 400. The components shown in FIG. 4 are only examples, and are not intended to suggest any limitation as to the scope of the functionality of the invention; the invention is not necessarily dependent on the features shown in FIG. 4.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various tangible computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 4, the components of computer 400 may include, but are not limited to, a processing unit 402, a system memory 404, and a system bus 406 that couples various system components including the system memory to the processing unit 402. The system bus 406 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 400 typically includes a variety of computer-readable media. Computer-readable media can be any available media that can be accessed by computer 400 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. In one or more embodiments, the procedures and methods of the present teachings can be implemented by way of such computer-readable instructions, data structures, program modules, and/or data included on corresponding computer-readable media.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 400. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 404 includes computer storage media in the form of volatile and/or nonvolatile memory such as read only memory (ROM) 408 and random access memory (RAM) 410. A basic input/output system 412 (BIOS), containing the basic routines that help to transfer information between elements within computer 400, such as during start-up, is typically stored in ROM 408. RAM 410 typically contains data and/or program modules that are immediately accessible to and/or presently being operated on by processing unit 402. By way of example, and not limitation, FIG. 4 illustrates operating system 414, application programs 416, other program modules 418, and program data 420.

The computer 400 may also include other removable/non-removable, volatile/nonvolatile computer storage media. By way of example only, FIG. 4 illustrates a hard disk drive 422 that reads from or writes to non-removable, nonvolatile magnetic media, a magnetic disk drive 424 that reads from or writes to a removable, nonvolatile magnetic disk 426, and an optical disk drive 428 that reads from or writes to a removable, nonvolatile optical disk 430 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 422 is typically connected to the system bus 406 through a non-removable memory interface such as data media interface 432, and magnetic disk drive 424 and optical disk drive 428 are typically connected to the system bus 406 by a removable memory interface (not shown).

The drives and their associated computer storage media discussed above and illustrated in FIG. 4 provide storage of computer-readable instructions, data structures, program modules, and other data for computer 400. In FIG. 4, for example, hard disk drive 422 is illustrated as storing operating system 415, application programs 417, other program modules 419, and program data 421. Note that these components can either be the same as or different from operating system 414, application programs 416, other program modules 418, and program data 420. Operating system 415, application programs 417, other program modules 419, and program data 421 are given different numbers here to illustrate that, at a minimum, they are different copies. A user may enter commands and information into the computer 400 through input devices such as a keyboard 436 and pointing device 438, commonly referred to as a mouse, trackball, or touch pad. Other input devices (not shown) may include a microphone, joystick, game pad, satellite dish, scanner, or the like. These and other input devices are often connected to the processing unit 402 through an input/output (I/O) interface 440 that is coupled to the system bus, but may be connected by other interface and bus structures, such as a parallel port, game port, or a universal serial bus (USB). A monitor 442 or other type of display device is also connected to the system bus 406 via an interface, such as a video adapter 444. In addition to the monitor 442, computers may also include other peripheral output devices 446 (e.g., speakers) and one or more printers 448, which may be connected through the I/O interface 440.

The computer may operate in a networked environment using logical connections to one or more remote computers, such as a remote computing device 450. The remote computing device 450 may be a personal computer, a server, a router, a network PC, a peer device or other common network node, and typically includes many or all of the elements described above relative to computer 400. The logical connections depicted in FIG. 4 include a local area network (LAN) 452 and a wide area network (WAN) 454. Although the WAN 454 shown in FIG. 4 is the Internet, the WAN 454 may also include other networks. Such networking environments are commonplace in offices, enterprise-wide computer networks, intranets, and the like.

When used in a LAN networking environment, the computer 400 is connected to the LAN 452 through a network interface or adapter 456. When used in a WAN networking environment, the computer 400 typically includes a modem 458 or other means for establishing communications over the Internet 454. The modem 458, which may be internal or external, may be connected to the system bus 406 via the I/O interface 440, or other appropriate mechanism. In a networked environment, program modules depicted relative to the computer 400, or portions thereof, may be stored in the remote computing device 450. By way of example, and not limitation, FIG. 4 illustrates remote application programs 460 as residing on remote computing device 450. It will be appreciated that the network connections shown are exemplary and other means of establishing a communications link between the computers may be used.

CONCLUSION

The above-described embodiments provide for gamut mapping spectral content so as to control one or more appearance-based dimensions of a destination image. Spectral data sets are used to define respective source and destination images, so that over-sampling of visual color information can be advantageously exploited in a multi-channel spectral system. Derivation and mapping of appearance content enables two different gamuts to be considered and accommodated within an imaging system. In this way, for example, metamerism can be controlled and/or manipulated so as to reduce or minimize humanly-perceptible color changes in a final rendered image over varying viewing conditions.

Although the embodiments have been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

What is claimed is:

1. One or more computer-readable storage devices with instructions stored thereon that, when executed by one or more processors, perform operations comprising:

deriving, from a source image, first appearance content from first spectral data, the first spectral data defined by N spectral channels and including at least one spectral channel outside of a visually perceptible spectrum, the first appearance content being defined by M channels within the visually perceptible spectrum, N being a positive integer value greater than one and M being a positive integer value less than N;

mapping the first appearance content to an appearance delta using a gamut mapping algorithm; and deriving, for a destination image, second spectral data from the first spectral data and the appearance delta using a spectral mapping algorithm, the second spectral data defined by K spectral channels and derived to manipulate metamerism to reduce visually perceptible differences in color content when the destination image is rendered and being viewed under varying external illumination conditions, K being a positive integer value greater than M.

2. The one or more computer-readable storage devices of claim 1, wherein at least one of the first spectral data or the second spectral data is defined by at least four spectral channels.

3. The one or more computer-readable storage devices of claim 1, wherein at least one of the first appearance content or the appearance delta is defined by three channels of lightness, chroma and hue.

4. The one or more computer-readable storage devices of claim 1, wherein:

the first appearance content corresponds to a gamut of a source device; and the appearance delta corresponds to a determined differential between the gamut of the source device and a gamut of a destination device.

5. The one or more computer-readable storage devices of claim 4, wherein the gamut of the source device does not match the gamut of the destination device.

6. The one or more computer-readable storage devices of claim 1, wherein the second spectral data is further derived so as to reduce a visually perceptible difference in color content between the source image and the destination image.

7. The one or more computer-readable storage devices of claim 1, wherein the varying external illumination conditions comprise natural sunlight and incandescent illumination or a wide spectral range of fluorescent illumination and the second spectral data is further derived to maximize a tristimulus match to reduce the visually perceptible differences in the color content when the destination image is being viewed under the varying external illumination conditions.

8. One or more computer-readable storage devices including computer-readable instructions configured to cause one or more processors to:

derive, from a source image, first appearance content from first spectral data, the first spectral data defined by N spectral channels and including at least one spectral channel outside of a visually perceptible spectrum, the first appearance content being defined by M channels within the visually perceptible spectrum, N being a positive integer value greater than one and M being a positive integer value less than N;

map the first appearance content to an appearance delta; and derive, for a destination image, second spectral data from the first spectral data and the appearance delta, the second spectral data being defined by K spectral channels and derived to maximize a tristimulus match and control or manipulate metamerism to minimize visually perceptible differences in color content when the destination image is rendered and being viewed under varying external illumination conditions, K being a positive integer value greater than M.

9. The one or more computer-readable storage devices of claim 8, wherein at least one of the first spectral data or the second spectral data is defined by at least four spectral channels.

10. The one or more computer-readable storage devices of claim 8, wherein at least one of the first appearance content or the appearance delta is defined by three channels.

11. The one or more computer-readable storage devices of claim 8, wherein:

the first appearance content corresponds to a gamut of a source device; and the appearance delta corresponds to a determined differential between the gamut of the source device and a gamut of a destination device.

12. The one or more computer-readable storage devices of claim 11, wherein the gamut of the source device does not match the gamut of the destination device.

13. The one or more computer-readable storage devices of claim 8, wherein the second spectral data is further derived to reduce a visually perceptible difference in color content between the source image and the destination image.

14. The one or more computer-readable storage devices of claim 8, wherein the second spectral data is further derived to reduce a visually perceptible shift in color content of the destination image over a predetermined range of viewing conditions.

15. A computer-implemented method implemented at least in part by a computing device, the method comprising:

under control of one or more computer systems configured with executable instructions, providing first spectral data, the first spectral data defined by N spectral channels and corresponding to a source image, N being a positive integer value greater than one, the first spectral data including at least one spectral channel outside of a visually perceptible spectrum;

under control of one or more computer systems configured with executable instructions, deriving first appearance content from the first spectral data, the first appearance content being defined by M channels within the visually perceptible spectrum, the first appearance content corresponding to a first gamut, M being a positive integer value less than N;

under control of one or more computer systems configured with executable instructions, mapping the first appearance content to an appearance delta using a gamut mapping algorithm, the appearance delta corresponding to a determined differential between the first gamut and a second gamut; and under control of one or more computer systems configured with executable instructions, deriving, for a visually perceptible image, second spectral data from the first spectral data and the appearance delta, the second spectral data defined by K spectral channels, K being a positive integer value greater than M, the second spectral data derived to maximize a tristimulus match and control metamerism to reduce visually perceptible differences in color content in the visually perceptible image when being viewed under varying illumination conditions.

16. The method of claim 15, wherein at least one of the first or second gamuts is defined by lightness, chroma and hue channels.

17. The method of claim 15, wherein:
the first spectral data corresponds to an image detecting apparatus;
the first spectral data is over-sampled with respect to the first appearance content; and
the second spectral data corresponds to an image rendering apparatus.

18. The method of claim 15, further comprising rendering the second spectral data as the visually perceptible image.

19. The method of claim 18, wherein the second spectral data is further derived to reduce a visually perceptible difference in color content between the first source image and the visually perceptible image.

* * * * *

UNITED STATES PATENT AND TRADEMARK OFFICE
CERTIFICATE OF CORRECTION

| | | |
|---|---|---|
| PATENT NO. | : 8,068,255 B2 | Page 1 of 1 |
| APPLICATION NO. | : 11/561060 | |
| DATED | : November 29, 2011 | |
| INVENTOR(S) | : Michael D. Stokes | |

It is certified that error appears in the above-identified patent and that said Letters Patent is hereby corrected as shown below:

In column 12, line 7, in Claim 19, delete "first source" and insert -- source --, therefor.

Signed and Sealed this
Twenty-first Day of February, 2012

David J. Kappos
*Director of the United States Patent and Trademark Office*